(12) United States Patent
Hurter et al.

(10) Patent No.: US 10,438,398 B2
(45) Date of Patent: Oct. 8, 2019

(54) OBJECT DEFINITION IN VIRTUAL 3D ENVIRONMENT

(71) Applicant: ECOLE NATIONALE DE L'AVIATION CIVILE, Toulouse (FR)

(72) Inventors: Christophe Hurter, Toulouse (FR); Michael Traoré Sompagnimdi, Toulouse (FR)

(73) Assignee: ECOLE NATIONALE DE L'AVIATION CIVILE, Toulouse (FR)

( * ) Notice: Subject to any disclaimer, the term of this patent is extended or adjusted under 35 U.S.C. 154(b) by 0 days.

(21) Appl. No.: 15/466,991

(22) Filed: Mar. 23, 2017

(65) Prior Publication Data

US 2017/0278298 A1   Sep. 28, 2017

(30) Foreign Application Priority Data

Mar. 24, 2016   (EP) ..................................... 16305338

(51) Int. Cl.
| | |
|---|---|
| *G06T 15/08* | (2011.01) |
| *G06T 19/00* | (2011.01) |
| *G06T 7/11* | (2017.01) |
| *G06T 7/162* | (2017.01) |
| *G06T 7/187* | (2017.01) |
| *G06T 7/136* | (2017.01) |

(52) U.S. Cl.
CPC ............... *G06T 15/08* (2013.01); *G06T 7/11* (2017.01); *G06T 7/136* (2017.01); *G06T 7/162* (2017.01); *G06T 7/187* (2017.01); *G06T 19/003* (2013.01); *G06T 2207/10081* (2013.01); *G06T 2207/20072* (2013.01); *G06T 2207/20101* (2013.01); *G06T 2207/30112* (2013.01); *G06T 2219/004* (2013.01)

(58) Field of Classification Search
None
See application file for complete search history.

(56) References Cited

U.S. PATENT DOCUMENTS

| 2008/0097155 A1* | 4/2008 | Gattani ............. A61B 1/00039 600/117 |
| 2015/0262416 A1* | 9/2015 | Hecht .................. G06T 17/005 345/424 |

FOREIGN PATENT DOCUMENTS

CA   2365062 A   6/2003

OTHER PUBLICATIONS

European Search Report for 16305338.2 dated Oct. 12, 2016.
(Continued)

*Primary Examiner* — Yi Wang
(74) *Attorney, Agent, or Firm* — Meagher Emanuel Laks Goldberg & Liao, LLP

(57) ABSTRACT

Objects in a voxel based computer generated three dimensional environment are identified by traversing adjacent voxels meeting a predetermined criterion with respect to a scalar metadata value associated with each voxel, such as opacity or density. These adjacent voxels may be explored in accordance with a tree-crawling algorithm such as a breadth first or depth first algorithm. Once all adjacent cells meeting the criterion are identified, these are determined to represent a discrete object, and displayed as such. The starting point for the traversing process may be the voxel closest to a virtual camera position along the line of sight of that virtual camera meeting the criterion.

12 Claims, 10 Drawing Sheets

(56) References Cited

OTHER PUBLICATIONS

Justice R K et al: "3-D segmentation of MR brain images using seeded region growing", Engineering in Medicine and Biology Society, 1996. Bridging Discipline S for Biomedicine., 18th Annual International Conference of the IEEE Amsterdam, Netherlands Oct. 31-Nov. 3, 1996, New York, NY, US, IEEE, US. vol. 3, Oct. 31, 1996 (Oct. 31, 1996), pp. 1083-1084.

J. Jankowksi et al: "Advances in Interaction with 3D Environments", Computer Graphics Forum, vol. 34, No. 1, Oct. 20, 2014 (Oct. 20, 2014), pp. 152-190.

Wiebel A. et al: "WYSIWYP: What You See Is What You Pick", IEEE Transactions on Visualization and Computer Graphics, IEEE Service Center, Los Alamitos, CA, US, vol. 18, No. 12, Dec. 1, 2012 (Dec. 1, 2012), pp. 2236-2244.

Ferran Argelaguet et al: "A survey of 3D object selection techniques for virtual environments", Computers & Graphics, vol. 37, No. 3, May 1, 2013 (May 1, 2013), pp. 121-136.

Jaime Silvela et al: "Breadth-First Search and Its Application to Image Processing Problems", IEEE Transactions on Image Processing, IEEE Service Center, Piscataway, NJ, US, vol. 10, No. 8, Aug. 1, 2001 (Aug. 1, 2001).

Marks J et al: "Design Galleries: A General Approach to Setting Paraeters for Computer Graphics and Animation", Jan. 1, 1997 (Jan. 1, 1997, Computer Graphics Proceedings, SIGGRAPH 97. Los Angeles, Aug. 3-8, 1997; [Computer Graphics Proceedings. SIGGRAPH], Reading, Addison Wesley, US, pp. 389-400.

B Bhanu et al: "Adaptive integrated image segmentation and object recognition", IEEE Transactions on Systems, Man, and Cybernetics, Part C (Applications and Reviews, Jan. 1, 2000 (Jan. 1, 2000), pp. 427-441.

Annex to European Office Action issued in corresponding EP16305338. 2, dated Jan. 23, 2019.

Chen et al.: "Sketch-based volumetric seeded region growing", Proceedings of the third Eurographics Conference on sketch-based interfaces and modeling, Sep. 3, 2006, pp. 123-130, DOI: 10.2312/SBM/SBM06/123-129, ISBN: 978-3-905673-39-5.

* cited by examiner

OBJECT DEFINITION IN VIRTUAL 3D ENVIRONMENT

FIELD OF THE INVENTION

The present invention relates to the assisted exploration of computer generated virtual environments, and in particular the identification of discrete objects in such environments.

BACKGROUND OF THE INVENTION

Volumetric datasets are found in many fields, such as engineering, material sciences, medical imaging, astrophysics. The exploration of volumetric datasets is not trivial, and is heavily impacted by the specific needs of users. In most airports for example, security agents deal with such data exploration in the context of baggage inspections. X-ray and tomography are two commonly used fluoroscopic scanning systems. X-ray systems provide a flattened 2D luggage scan while tomography systems produce transversal scans, also called slices. Thanks to data processing techniques such as the Radon transform, these systems can produce a full 3D scan, comprising a set of voxels with corresponding density data. Since the resulting X-ray scanned image only contains voxel or pixel densities, it cannot display the original material colours. The standard colour visual mapping uses three different colours (orange, green, and blue) to display the data density. Orange colour corresponds to low density (mainly organic items). In opposition, blue colour is used for high density values (i.e. metal). In the case of X-ray systems, green colour corresponds to the superposition of different kinds of materials or average density materials.

FIG. 1 demonstrates some of the ways in which an article may be obscured in a scan. As shown in FIG. 1, the displayed 2D scanned image can suffer from four issues:
Superposition: A threat (e.g. prohibited object like knife, cutter . . . ) may be sheltered behind dense materials. Sometimes, it's possible to see through this blind shield using functionalities such as high penetration (enhanced X-ray power) or image processing (contrast improvement). As shown in FIG. 1, the umbrella and dense collection of objects in the upper right hand corner 101 may obscure articles of interest.
Location: Depending on its location inside the luggage, a threat can be difficult to detect. Objects located in the corners, in the edges or inside the luggage's frame are very difficult to identify. As shown in FIG. 1, the retractable trolley bars and the rigid corners of the case 102 may obscure articles of interest.
Dissociation: Another way to dissimulate a threat is to separate and to spread parts of it in the luggage (weapons or explosives are composed of many separated items like the trigger, the barrel . . . ). This dissociation can be combined with other dissimulation techniques. As shown in FIG. 1, a number of apparently non-descript items 103 are present which are unlikely to attract particular attention, but which may be assembled to form some article of interest.
Lure: An ill-intentioned individual may use a lure to hide the real threat. For instance, a minor threat like a small scissors may be clearly visible and catch security agent's attention while a more important threat remains hidden. As shown in FIG. 1, the metal rod 104 may attract the attention of the user, drawing it away from some less visible threat.

Volumetric data exploration with direct volume rendering techniques is of great help to visually extract relevant structures in many fields of science: medical imaging, astrophysics and more recently in luggage security. To leverage this knowledge extraction, many techniques have been developed. A number of existing basic technologies are known in this field, including volume visualization, transfer function, direct voxel manipulation and focus plus context interaction.

In particular, volume visualization can be done with a geometric rendering system which transforms the data into a set of polygons representing an iso-surface. The contour tree algorithm and other alternatives such as branch decomposition are usually used to find these iso-surfaces. Contour tree algorithms may be vulnerable to noise, which can be problematic in luggage inspections since dense materials such as steel cause noise by reflecting the X-rays.

In order to investigate volumetric dataset, one can use the Transfer Function (TF). In practice, this maps the voxel density with a specific colour (including its transparency). Transfer functions can be 1, 2 or n dimensional and are of great help to isolate structures of interest in volumetric data. Thanks to the colour blending process, a suitable transfer function can also reveal iso-surfaces or hide density to improve the volumetric data visualization.

A specific difficulty arises in an environment such as that described with respect to FIG. 1 is that the user's view of a particular article of interest will often be obscured by a number of other objects of no interest. In order to better view the objects of interest, the user may wish to isolate or highlight objects of interest, or selectively remove or render less visible interfering objects. In a voxel based environment however, there is no inherent detection of objects, since the whole environment is simply a matrix of voxels of varying densities. It is desirable to provide functions for effectively identifying discrete objects in such an environment.

SUMMARY OF THE INVENTION

In accordance with a first aspect there is provided a method of selecting voxels for display in a computer generated image based on a three dimensional volume defined by a collection of voxels, comprising the steps of: selecting a first voxel having a scalar metadata value exceeding a predetermined threshold, assessing each voxel adjacent the first voxel, and selecting and tagging each adjacent voxel whose scalar metadata value threshold exceeds the predetermined scalar metadata value threshold. These steps of assessing, selecting and tagging are repeated for each voxel adjacent a tagged voxel until no further voxels meet the criteria for assessment. This approach provides a rapid mechanism for isolating an object in a set of voxels, with minimal demands on system resources.

In accordance with a development of the first aspect, the tagged voxels are displayed. Displaying the object may be an end in itself, and also permits visual confirmation of the effectiveness of the identification and the underlying thresholds, thereby avoiding errors.

In accordance with a further development of the first aspect a virtual camera position is determined, and a straight path established between a part of said object and said virtual camera position, and wherein said first voxel is selected as being the voxel nearest said virtual camera position situated along said path and exceeding the predetermined scalar metadata value threshold. Starting the object identification process with a point of gaze of a user provides a low complexity mechanism for setting thresholds and defining the first voxel with a high chance of coinciding with the users expectations, without requiring explicit input from the user, thereby minimising corrective effort and saving time and computing resources.

In accordance with a further development of the first aspect the scalar metadata value represents the opacity of the respective voxel. By using opacity data, the mechanism is inherently compatible with many existing systems, thereby reducing development cost and the need for additional translation of datatypes, thereby saving on system resource demands.

In accordance with a further development of the first aspect the voxels are arranged in a non-cubic lattice. The proposed mechanism is adaptable to many different modelling contexts.

In accordance with a further development of the first aspect the step of repeating the steps of assessing, selecting and tagging for each voxel adjacent a tagged voxel until no further voxels meet the criteria for assessment involves traversing the tree defined by voxels whose scalar metadata value threshold exceeds said predetermined scalar metadata value threshold, and connected to said first selected voxel by a chain of other such voxels. Handling the process as a tree crawling problem makes the mechanism directly compatible with advances in graph exploration technology.

In accordance with a further development of the first aspect the tree is traversed according to a depth-first algorithm.

In accordance with a further development of the first aspect the tree is traversed according to a breadth-first algorithm.

In accordance with a further development of the first aspect the steps are performed in real time in response to user input specifying different scalar metadata value threshold values. Enabling the user to specify the threshold values supports direct control of the object process. This may lead to a more rapid convergence on optimal values, reducing processing time and system resource demands, and reducing errors.

In accordance with a further development of the first aspect, the steps of selecting a first voxel and assessing, selecting and tagging each adjacent voxel are repeated for the same set of voxels and the same first selected voxel, with a plurality of different scalar metadata value threshold values.

In accordance with a further development of the first aspect the step of displaying the tagged voxels comprises displaying the results of each iteration of the steps simultaneously, each in a respective representation of the same view. Enabling the user to compare results with different threshold values supports may lead to a more rapid convergence on optimal values, reducing processing time and system resource demands, and reducing errors.

In accordance with a further development of the first aspect, the object defined by the voxels tagged in each iteration is compared to a library of known objects, and the scalar metadata value threshold providing the object corresponding most closely to the library model is retained for presentation of the object to the user. Enabling the user to compare results with different threshold values supports may lead to a more rapid convergence on optimal values, reducing processing time and system resource demands, and reducing errors.

In accordance with a second aspect there is provided an apparatus adapted to implement the method of any preceding claim.

In accordance with a third aspect there is provided an apparatus adapted to select voxels for display in a computer generated image based on a three dimensional volume defined by a collection of voxels, said apparatus adapted to select a first voxel having a scalar metadata value exceeding a predetermined threshold, said apparatus being further adapted to assess each voxel adjacent said first voxel, and select and tag each adjacent voxel whose scalar metadata value threshold exceeds said predetermined scalar metadata value threshold, said apparatus being still further adapted to repeat said steps of assessing, selecting and tagging for each voxel adjacent a tagged voxel until no further voxels meet the criteria for assessment.

In accordance with a fourth aspect there is provided a computer program adapted to implement the steps of the first aspect.

BRIEF DESCRIPTION OF THE DRAWINGS

The above and other advantages of the present invention will now be described with reference to the accompanying drawings, in which.

and

Figure 11:
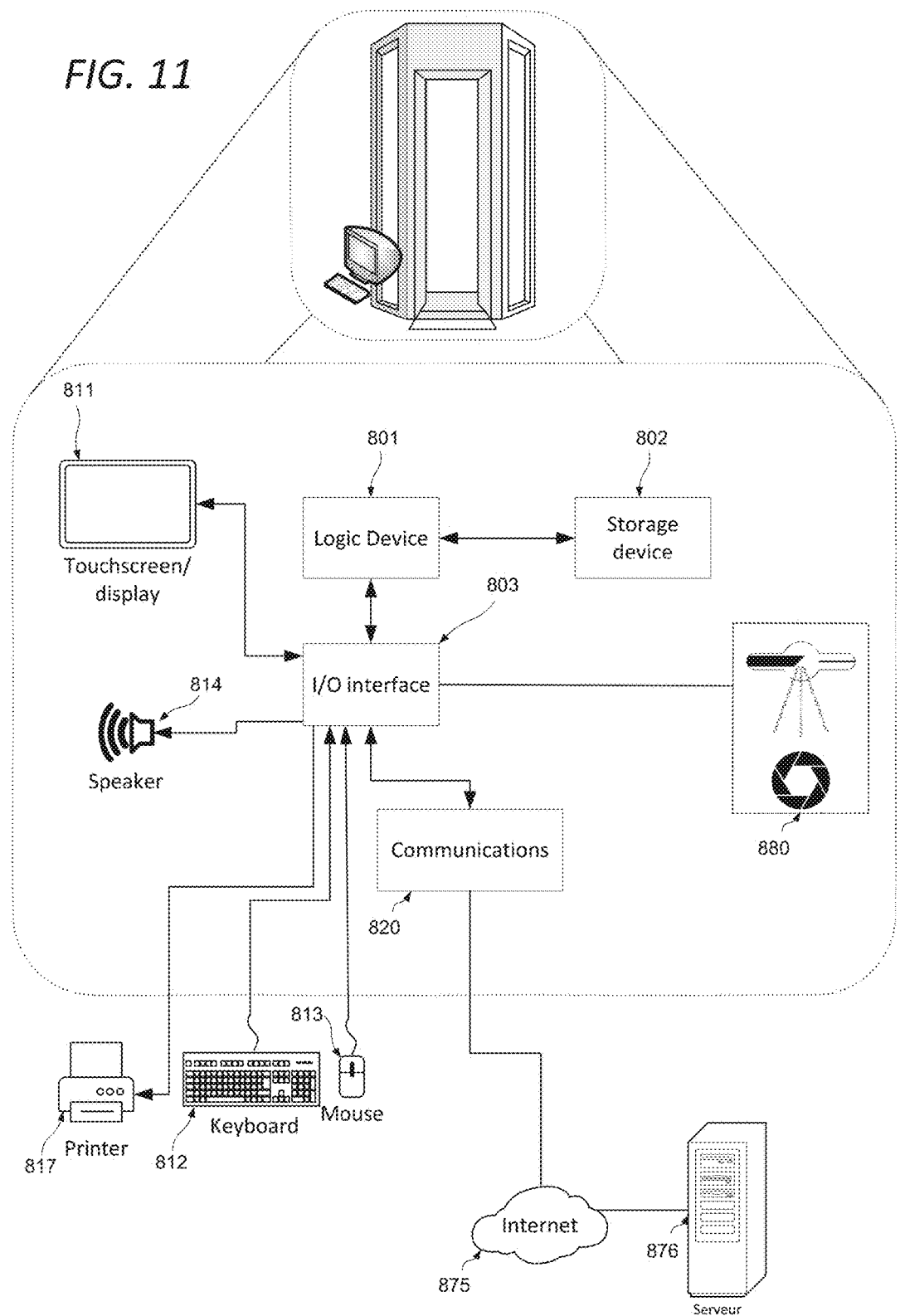

FIG. 11 shows a body scanner system adaptable to constitute an embodiment.

DETAILED DESCRIPTION

Figure 2:
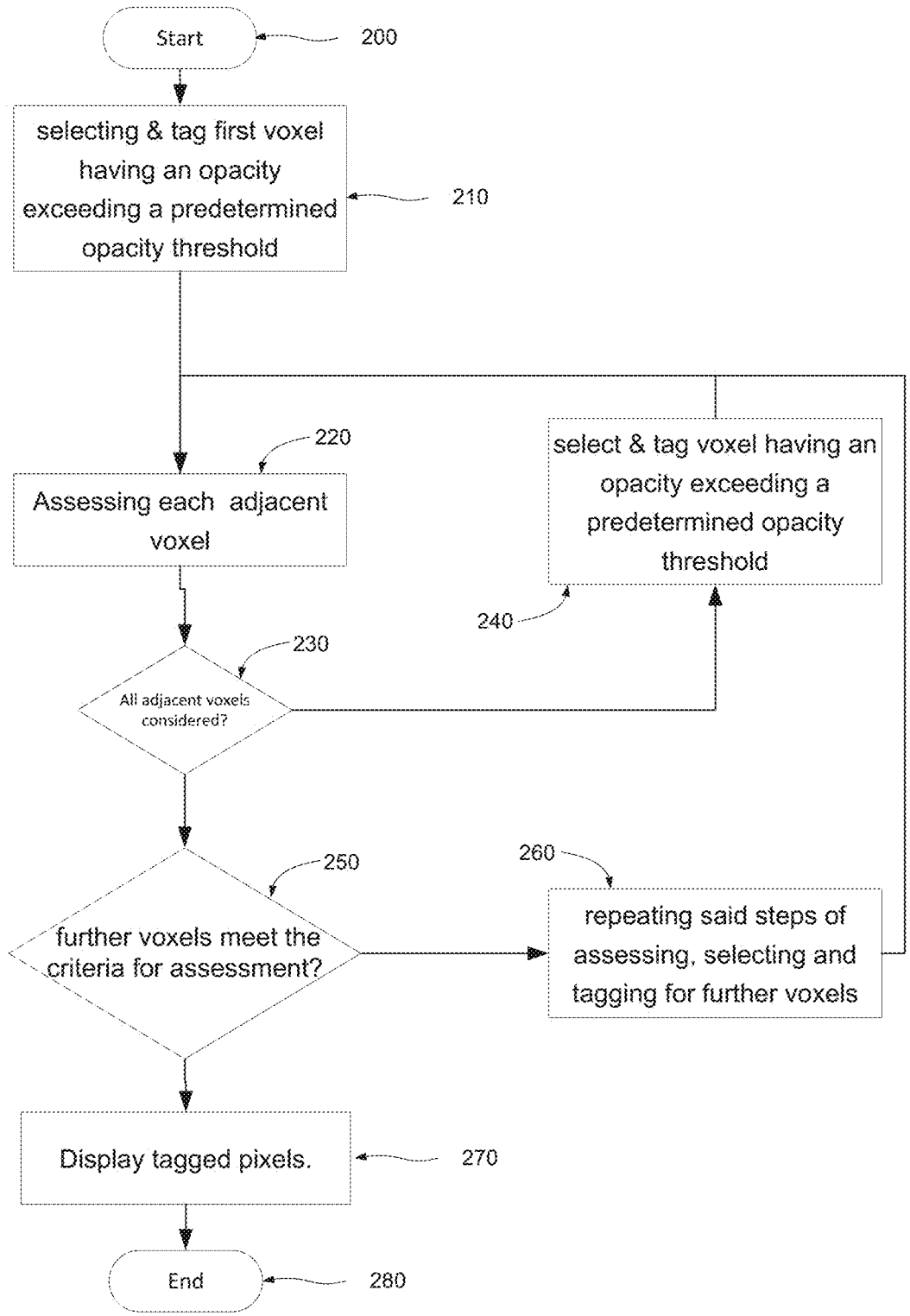
FIG. 2 shows a method according to an embodiment.

FIG. 2 shows a method according to an embodiment.

As shown in FIG. 2 there is provided a method of selecting voxels for display in a computer generated image based on a three dimensional volume defined by a collection of voxels. The method starts at step 200 before proceeding at step 210 to select a first voxel having a scalar metadata value exceeding a predetermined scalar metadata value threshold. For the purposes of the present example, the scalar metadata value will be assumed to represent the opacity associated with the voxel, however the scalar metadata value may have any meaning, representing for example colour, density, etc. The method next proceeds to step 220, at which each voxel adjacent the first voxel is assessed. For any adjacent voxel whose opacity threshold exceeds the predetermined opacity threshold, the method proceeds to step 240 at which that voxel is selected and tagged. Once all adjacent voxels have been assessed for a given selected voxel, the method proceeds to Step 250 at which it is considered whether other voxels meet the criteria for assessment (i.e. being adjacent a tagged voxel and exceeding the predetermined opacity threshold) in which case the method loops back via step 260 to repeat the steps of assessing 220, and selecting and tagging 240 for each voxel adjacent a tagged voxel until no further voxels meet the criteria for assessment, whereupon the method proceeds display all of the tagged voxels at step 270.

The step of displaying the tagged voxels may be omitted altogether, or carried out at some arbitrary later time as desired.

The process of FIG. 2 may be iterated to identify the objects in an environment, by changing to a new first voxel and a new tag, and repeating said steps of selecting, assessing and changing until all voxels in said computer generated environment have been tagged. On this basis, each set of voxels with the same tag is taken to constitute an object.

It will be appreciated that the basic underlying approach of FIG. 2 may be achieved by a variety of different mechanisms. The process of assessing the voxels adjacent a currently selected voxel may involve assessing each adjacent voxel may be carried out for each adjacent voxel in turn, or each may be assessed in parallel. The assessment process may be multistep in nature, for example first considering whether the voxel in question is already tagged, and then considering whether it meets the opacity criterion. In some embodiments, voxels might be tagged when they fail to meet the criteria rather than when they do meet it, or all voxels assessed may be tagged to indicate whether or not they meet the opacity threshold.

The definition of any objects identified in accordance with these steps may in some embodiments be retained for later reference. For example, the tagging of each new object may be specific to that object, or alternatively a registry of which voxels have been grouped together as an object may be compiled. Accordingly, by multiple applications of the described method the three dimensional environment may be defined in terms of a collection of objects, rather than a mere matrix of voxels. Furthermore, this approach may accelerate the process for subsequent applications of the process, since voxels that have already been identified as belonging to a first object can be excluded from the process.

Figure 3:
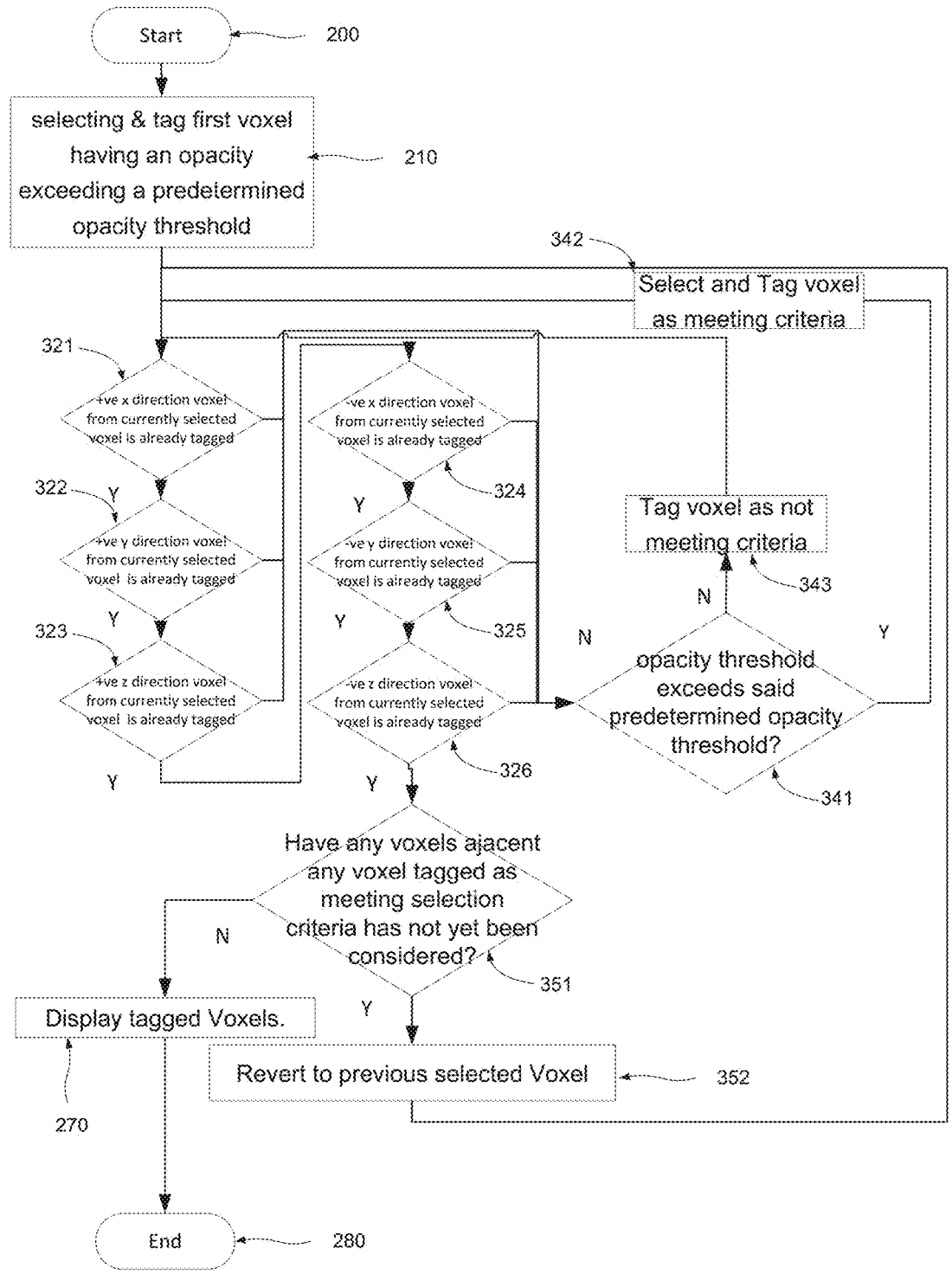
FIG. 3 is a more detailed implementation of the method of FIG. 2.

FIG. 3 is a more detailed implementation of the method of FIG. 2. As shown in FIG. 3, the method starts at step 200 before proceeding at step 210 to select a first voxel having an opacity exceeding a predetermined opacity threshold. The method next proceeds to step 321, at which it is determined whether the voxel adjacent the first voxel in the positive x direction has already been tagged. If the voxel has not been tagged, the method proceeds to set 341, at which it is determined whether the voxel under assessment exceeds the opacity threshold. If the threshold is exceeded, the voxel under assessment is tagged as meeting the selection criteria and selected as the frame of reference for the next assessments of adjacent voxels at step 342. Otherwise the voxel is tagged as not meeting the selection criteria at step 343, and the method then reverts to step 321. Assuming the adjacent voxel in the positive x direction did not meet the opacity threshold, the method will now proceed to step 322 from step 321, since the adjacent voxel in the positive x direction is now tagged as not meeting the selection criteria. The process will now repeat for each adjacent voxel in turn, with step 322 assessing the adjacent voxel in the positive y direction, step 323 assessing the adjacent voxel in the positive z direction, step 324 assessing the adjacent voxel in the negative x direction, step 325 assessing the adjacent voxel in the negative y direction and step 326 assessing the adjacent voxel in the negative z direction. For a given selected voxel, the method will eventually determine that all of the adjacent voxels have been tagged, either as meeting the selection criteria, or not, and will reach step 351 at which the method considers whether any voxel adjacent a voxel tagged as meeting the selection criteria has not yet been assessed. This will occur where the method selects a new voxel as the point of reference for the assessment of adjacent voxels at step 342, in which case any voxels not already assessed will be temporarily disregarded, until the method reverts to them at step 352. If on the other hand it is determined at step 351 that all voxels adjacent any voxels tagged as meeting the selection criteria have been tagged (as not meeting the selection criteria) then the arborescence is fully explored, and the method can proceed to display the voxels tagged as meeting the selection criteria at step 270 before terminating at step 280.

In some embodiments the opacity threshold may be two-fold, requireing that voxels must not only exceed a minimum value, but also must fall below a maximum value.

The different threshold values may be set depending on the characteristics of the object to be isolated, and of the surrounding materials, since it is by selecting the optimal thresholds that the object defined in accordance with the present invention can approach most closely a representation of a real object to which the representation may correspond. If the threshold is defined in terms of density, a metal object surrounded by clothing may be easily isolated, but a composite object such as a shoe may require careful fine tuning of thresholds before it can be properly isolated as an object. As such the lower threshold may be equal to the density of the density of the lowest density component the object of interest is likely to have. If the threshold object is defined in terms of an intermediate characteristic such as opacity, it may be necessary to convert back to the underlying physical context to select an appropriate threshold. In practice, a user may simply sweep through a range of threshold values, and observe the resulting variations in the appearance of the object and more or less peripheral voxels are included, and select the threshold or thresholds on the basis of whichever the user considers to give the best results.

The process of FIG. 3 may be iterated to identify the objects in an environment, by changing to a new first voxel and a new tag, and repeating said steps of selecting, assessing and changing until all voxels in said computer generated environment have been tagged. On this basis, each set of voxels with the same tag is taken to constitute an object.

Figure 4:
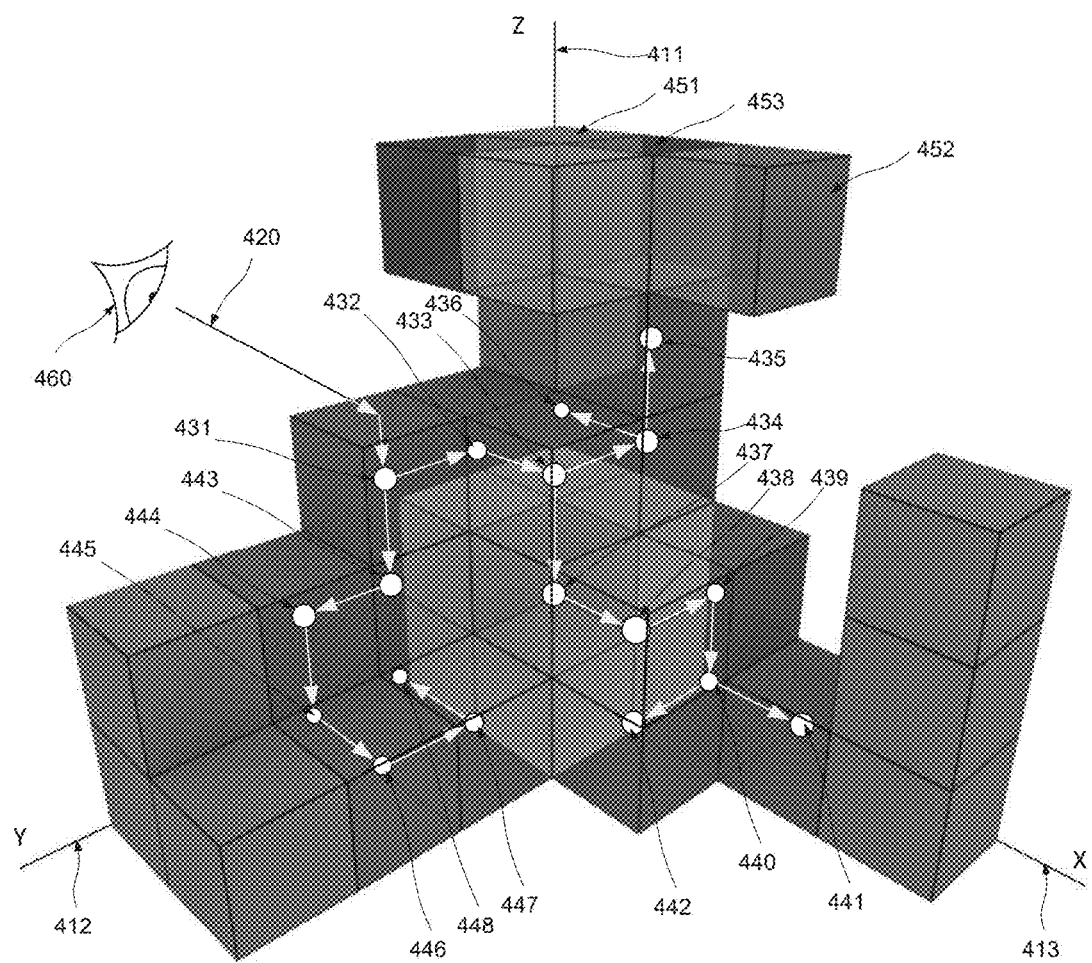
FIG. 4 shows an example of the application of the method of FIG. 3 to a specific collection of voxels.

FIG. 4 shows an example of the application of the method of FIG. 3 to a specific collection of voxels.

Figure 1:
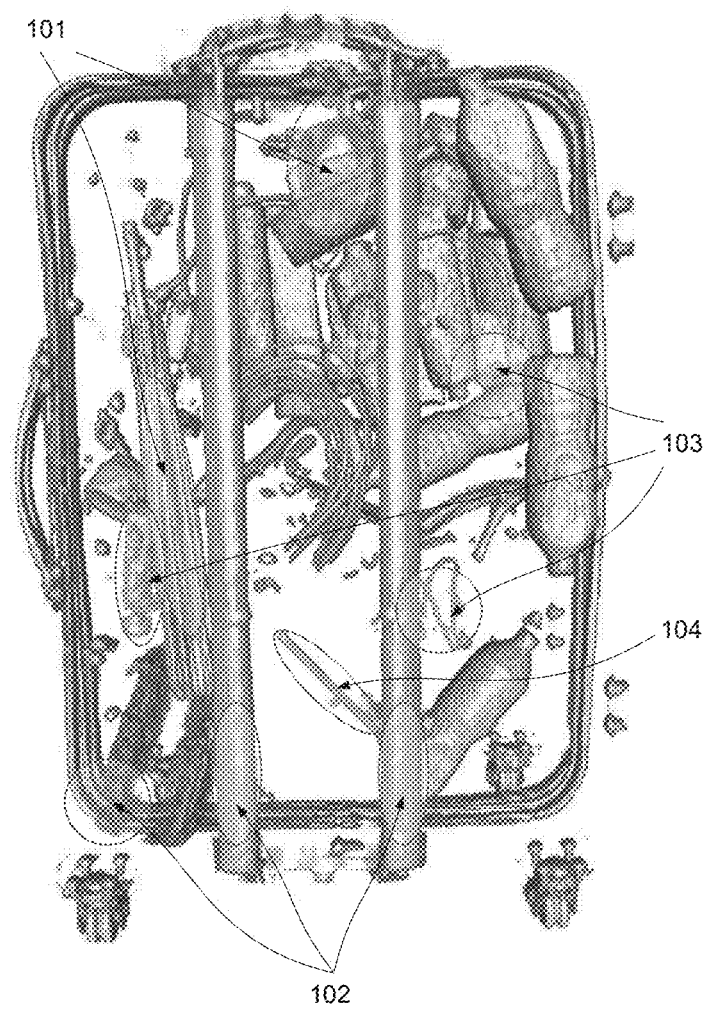
FIG. 1 demonstrates some of the ways in which an article may be obscured in a scan.

FIG. 4 shows a collection of voxels in a three dimensional space (3D) defined by x, y and z axes 411, 412, 413. As shown, the voxels are classified as belonging to one of four opacity levels. In the context of the application of FIG. 1, opacity is aligned with density, The densest voxels are shown in FIG. 4 pale and opaque (voxel 451 for example), the next densest are mid grey and somewhat transparent (voxel 452 for example), the next densest still are dark grey and highly transparent (voxel 453 for example), and the lest dense are not rendered for the sake of clarity. For the purposes of the present example, the opacity threshold is defined as the opacity of the medium density voxels.

The first selected voxel may be selected in a variety of different ways. For example, it may be selected as being the closest to the current position of the virtual camera 460 defining a user's point of view, which meets the predefined opacity threshold. On this basis, in view of the position and orientation of the virtual camera 460 and the predefined opacity threshold, for the purposes of the present example, the first selected voxel is voxel 431. Accordingly there is provided a further step of determining a virtual camera position, and establishing a straight path between a part of the object and the virtual camera position, whereby the first voxel is selected as being the voxel nearest said virtual camera position situated along said path and exceeding said predetermined opacity threshold.

In accordance with the method of FIG. 3, the method considers the voxel in the positive x direction from voxel 431. This voxel is not tagged, but does not meet the opacity threshold. The method then considers the voxel in the positive y direction. This voxel is not tagged, but does not meet the opacity threshold. The method then considers the voxel in the positive z direction. This voxel is not tagged, but does not meet the opacity threshold. The method then considers the voxel in the negative x direction. This voxel is not tagged, but does not meet the opacity threshold. The method then considers the voxel 432 in the negative y direction. This voxel is not tagged, and does meet the opacity threshold. Accordingly voxel 432 is tagged as meeting the selection criteria, and selected as the basis for the next round of assessments. It will be noted here that voxel 442 also meets the opacity threshold, but has not yet been assessed. The assessment process is repeated for voxel 432, which leads to the selection of voxel 433, then 434, then 435. When performing the assessment for voxel 435, it is determined that none of the adjacent voxels satisfies the opacity threshold, apart from voxel 434, which is already tagged, so that no new voxel can be selected. Accordingly the method proceeds to step 351 as described above, at which it is determined that voxel 436 is adjacent voxel 434 which is tagged as meeting the criteria for selection, but has not yet been assessed. Accordingly, the selection reverts to voxel 434. This time, voxel 435 is disregarded as already being tagged, and the selection proceeds to voxel 436. In a similar way, the selection then reverts to voxel 433 before proceeding through voxels 437, 438, 439, 440 and 441, and then reverts to 440 to reach 442, then reverts to 431 to explore the branch comprising voxels 443, 444, 445, 446, 447 and 448. By this means, the method has tagged each of the contiguous voxels meeting the opacity threshold starting from the chosen first selected voxel 431.

Figure 5:
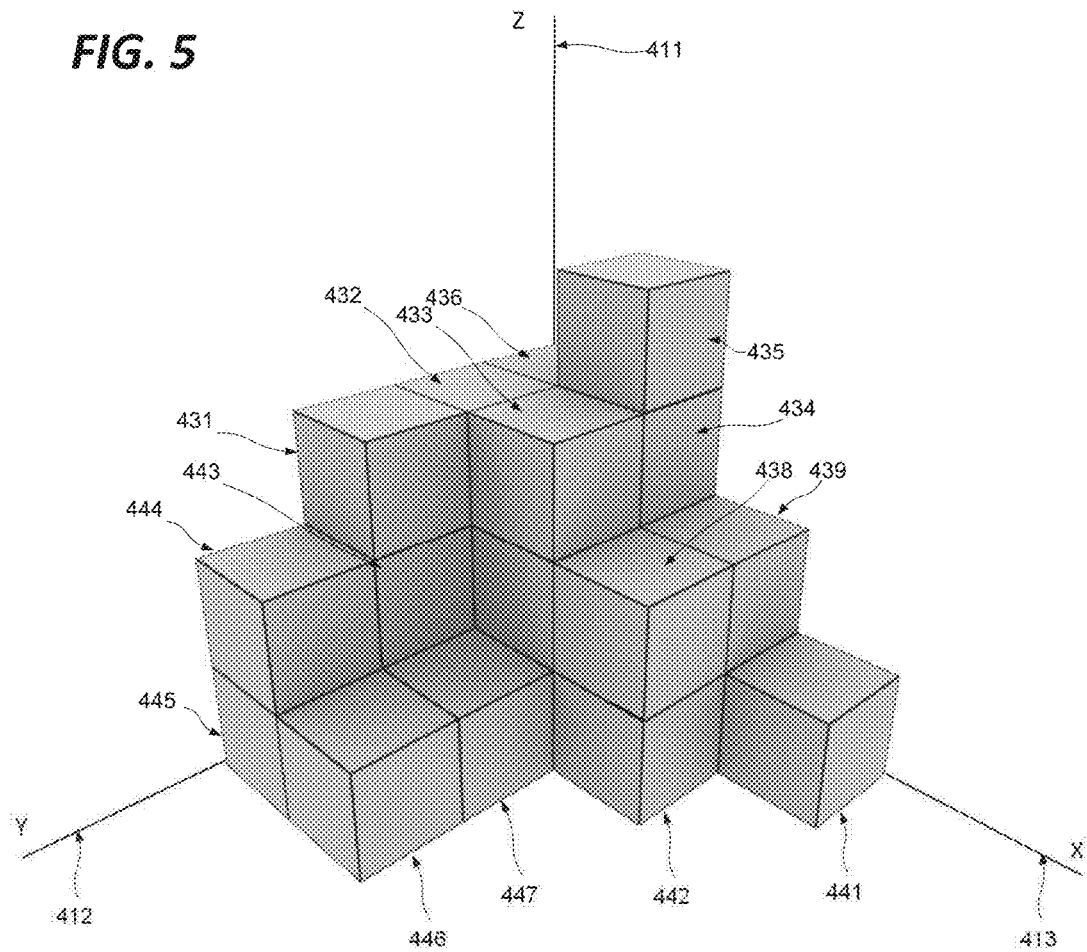
FIG. 5 shows the object identified in the example of FIG. 4.

FIG. 5 shows the object identified in the example of FIG. 4. The visible voxels 431, 432, 433, 434, 435, 436, 437, 438, 439, 441, 442, 443, 444, 445, 446, 447 are shown, whilst voxels 440 and 448 are obscured. All of the other voxels of FIG. 4, which were not tagged as meeting the criteria for selection have been removed in the displayed image, providing a clearer view of the identified object.

It will be appreciated that the definition of the object will depend heavily on the choice of the opacity threshold. For example, in a case where it is desired to isolate metal objects from surrounding organic material, a density threshold of 2500 kg/M$^3$ may prove effective, while if the objective is to separate living tissue from clothing and the like, a density threshold of 1000 kg/M$^3$ may prove effective. Where opacity is used as a representation of density, the corresponding opacity values to these density values will be used correspondingly.

Figure 6:
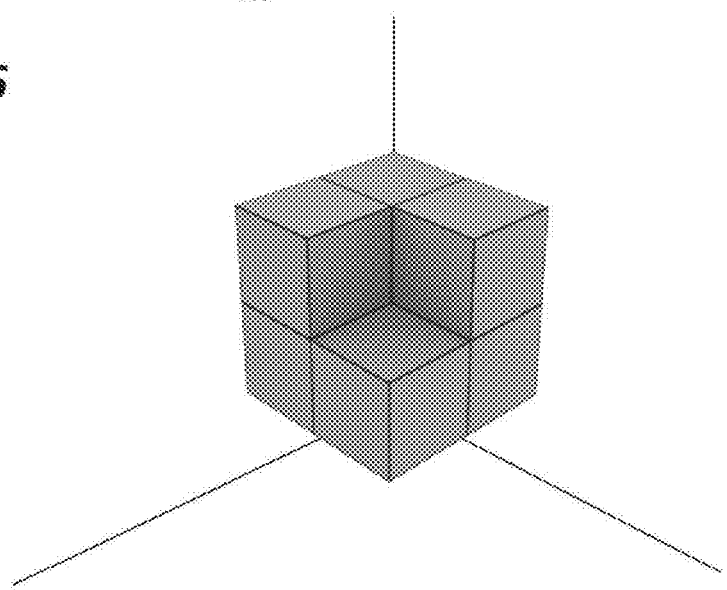
FIG. 6 shows the object that may be identified with a lower opacity threshold.

FIG. 6 shows the object that may be identified with a lower opacity threshold. In the example of FIGS. 4 and 5 as presented above, the method is applied with an opacity threshold corresponding to the lowest opacity level of the illustrated voxels. If the highest opacity level were selected, as represented by voxel 451 for example, a smaller object would be defined, representing the dense core of the object as shown in FIG. 6.

Figure 7:
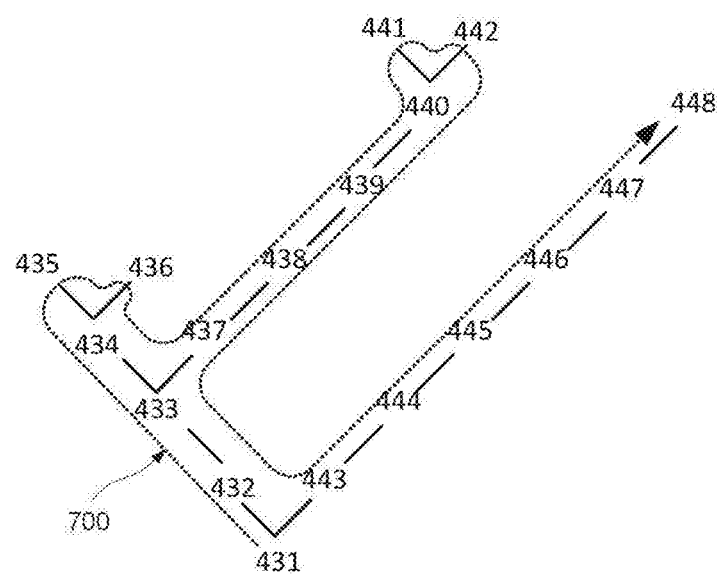
FIG. 7 represents the selected voxels of FIG. 4 as a tree.

FIG. 7 represents the selected voxels of FIG. 4 as a tree. It will be appreciated that the method described in detail with respect to FIG. 4 implements a tree crawl. As described with respect to FIG. 4 above the process follows a branch to its extremity (a depth-first search), and then backtracks to the nearest unexplored fork, and so on as represented by the dotted line 700. Other equivalent algorithms may revert to the furthest unexplored fork, or explore every possibility at each level of arborescence before proceeding to the next level (a Breadth-first search). In such an algorithm, the voxels might be selected in the order 431, 432, 443, 432, 433, 434, 437, 444, 435, 436, 445, 438, 446, 439, 447, 440, 447, 441, 442, 448, etc. Tree search algorithms is a domain of academic research in its own right, and embodiments may incorporate any such algorithm as required by suitable configuration at the relevant steps, in particular the step 260 of "repeated the steps of assessing selecting and tagging further voxels".

In accordance with certain embodiments, the process described with respect to FIG. 2 or 3 may be performed in real time in response to user input specifying different scalar metadata value threshold values, so that the user can immediately see the effect of the changes in scalar metadata value threshold value. Such user input may be input by means of slider bar, scroll wheel etc so that the user can rapidly try different values and identify that giving the most visually useful results.

In accordance with certain embodiments, the process described with respect to FIG. 2 or 3 may be repeated for the same set of voxels and the same first selected voxel, but with a range of different scalar metadata value threshold values. The resulting objects may be displayed sequentially to the user giving the user the opportunity to select the most visually convincing representation of the object in question.

In accordance with certain embodiments, the process described with respect to FIG. 2 or 3 may be repeated for the same set of voxels and the same first selected voxel, but with a range of different scalar metadata value threshold values. The resulting objects may be displayed together in multiple representations of the same view to the user giving the user the opportunity to select the most visually convincing representation of the object in question.

the process described with respect to FIG. 2 or 3 may be repeated for the same set of voxels and the same first selected voxel, but with a range of different scalar metadata value threshold values. The resulting objects may be compared to a library of known objects, and the scalar metadata value threshold providing the object corresponding most closely to the library model may be retained for presentation of the object to the user.

In the foregoing examples, adjacent voxels have been taken to be those having a face in common. In other embodiments the term may be extended in include voxels having a vertex in common, and still further, to voxel within a predetermined radius, or with a predetermined number of intervening voxels.

The foregoing embodiments have been described on the basis of voxels arranged in a cubic lattice. It will be appreciated that other voxel type structures are known, such as based on regular octahedrons and tetrahedrons, rhombic do-decahedra and truncated octahedral, etc. and that the process of FIG. 2 is applicable to any such structure so long as there it is possible to explicitly identify adjacent voxels.

In accordance with certain embodiments, objects in a voxel based computer generated three dimensional environment are identified by traversing through adjacent voxels meeting a predetermined criterion with respect to a scalar metadata value associated with each voxel, such as opacity or density. These adjacent voxels may be explored in accordance with a tree-crawling algorithm such as a breadth first or depth first algorithm. Once all adjacent cells meeting the criterion are identified, these are determined to represent a discrete object, and displayed as such. The starting point for the crawling process may be the voxel closest to a virtual camera position along the line of sight of that virtual camera meeting the criterion.

The disclosed methods can take form of an entirely hardware embodiment (e.g. FPGA), an entirely software embodiment (for example to control a system according to the invention) or an embodiment containing both hardware and software elements. As such, embodiments may comprise a number of subsystems, functional elements or means adapted to implement the invention in communication with each other, and/or with standard fixed function or programmable elements for example as described below.

Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device.

In accordance with certain embodiments, in order to browse between a collection of datasets susceptible of graphical representation, these datasets are associated with points on a sliding scale of one, two or three dimensions. When a point corresponding to a particular dataset is selected by a user via a mouse pointer, touch interface or the like. it is rendered as a graphical representation and presented to the user. When an intermediate point is selected, an interpolation of the datasets corresponding to the nearby points is generated and the resulting dataset rendered as a graphical representation and presented to the user. The interaction may be implemented with a slider bar type widget having hybrid behaviour such that clicking on the bar causes the button to jump to the nearest point corresponding to a data, while sliding to a chosen intermediate position activates the interpolation of adjacent datasets.

Figure 8:
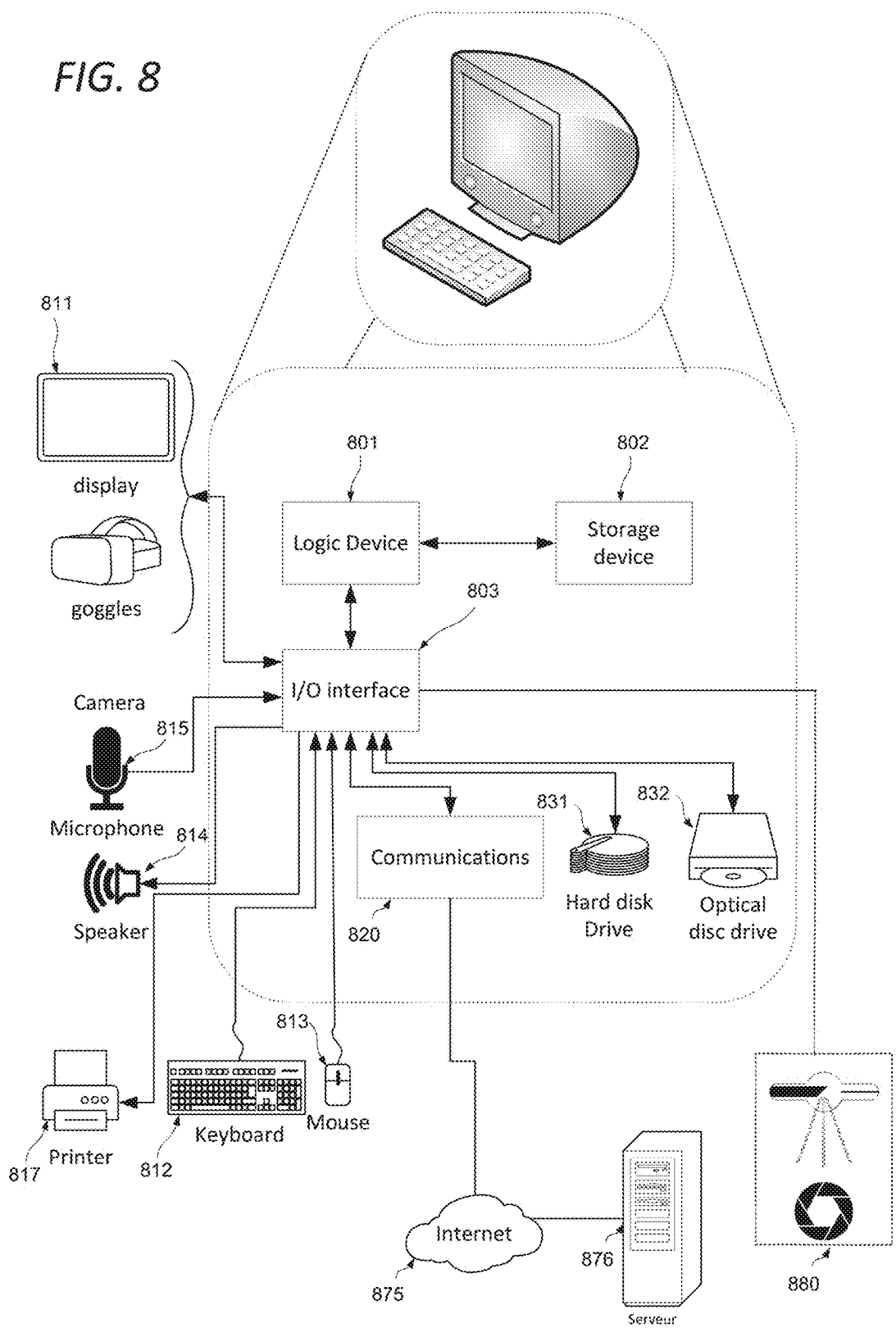
FIG. 8 shows a generic computing system suitable for implementation of embodiments of the invention.

FIG. 8 shows a generic computing system suitable for implementation of embodiments of the invention.

A shown in FIG. 8, a system includes a logic device 801 and a storage device 802. The system may optionally include a display subsystem 811, input/output subsystem 803, communication subsystem 820, and/or other components not shown.

Logic device 801 includes one or more physical devices configured to execute instructions. For example, the logic device 801 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 801 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 801 optionally may be distributed among two or more separate devices, which may be remotely located and/or configured for coordinated processing. Aspects of the logic device 801 may be virtualized and executed by remotely accessible, networked computing devices configured in a cloud-computing configuration.

Storage device 802 includes one or more physical devices configured to hold instructions executable by the logic device to implement the methods and processes described herein. When such methods and processes are implemented, the state of storage 802 device may be transformed—e.g., to hold different data.

Storage device 802 may include removable and/or built-in devices. Storage device 602 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 803 adapted to support communications between the Logic device 801 and further system components. For example, additional system components may comprise removable and/or built-in extended storage devices. Extended storage devices may comprise one or more types of storage device including optical memory 832 (e.g., CD, DVD, HD-DVD, Blu-Ray Disc, etc.), semiconductor memory (not shown) (e.g., RAM, EPROM, EEPROM, FLASH etc.), and/or magnetic memory 831 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 801 and storage device 802 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 8 may be used to implement embodiments of the invention.

For example a program implementing the steps described with respect to FIG. 2 or 3 may be stored in storage device 802 and executed by logic device 801. Data used for the creation of the graphical representation of the datasets comprising the voxels and their associated scalar metadata may be stored in storage 802 or the extended storage devices 832 or 831 and the display 811 used to display the graphical representation.

In some cases, the computing system may comprise or be in communication with a scanner 880 or other three dimensional imaging system as described above. This communication may be achieved by wired or wireless network, serial bus, firewire, Thunderbolt, SCSI or any other communications means as desired. In such cases, a program for the control of the scanner 880 and/or the retrieval of data therefrom may run concurrently on the logic device 801, or these features may be implemented in the same program as implementing the steps described with respect to FIG. 2 or 3.

Accordingly the invention may be embodied in the form of a computer program.

Furthermore, when suitably configured and connected, the elements of FIG. 8 may constitute an apparatus adapted to generate a graphical representation of a dataset, and cause a display device to display said representation; this apparatus may further be adapted to receive data from an eye tracking system indicating a point of regard. The apparatus may comprise storage for compiling a record of the point of regard over a duration, and the apparatus may further be adapted to modify the graphical representation to indicate the proportion of the duration for which said point of regard was directed at each point in said representation. This point of regard may then be assimilated to the selected point and/or the cursor as described above.

It will be appreciated that a "service", as used herein, is an application program executable across multiple user sessions. A service may be available to one or more system components, programs, and/or other services. In some implementations, a service may run on one or more server-computing devices.

When included, display subsystem 811 may be used to present a visual representation of data held by a storage device. This visual representation may take the form of a graphical user interface (GUI). As the herein described methods and processes change the data held by the storage device 802, and thus transform the state of the storage device 802, the state of display subsystem 811 may likewise be transformed to visually represent changes in the underlying data. Display subsystem 811 may include one or more display devices utilizing virtually any type of technology for example as discussed above. Such display devices may be combined with logic device and/or storage device in a shared enclosure, or such display devices may be peripheral display devices.

When included, input subsystem may comprise or interface with one or more user-input devices such as a keyboard 812, mouse 813, touch screen 811, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 820 may be configured to communicatively couple computing system with one or more other computing devices. For example, communication module of may communicatively couple computing device to remote service hosted for example on a remote server 876 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 874, or a wired or wireless local- or wide-area network. In some embodiments, the communication subsystem may allow computing system to send and/or receive messages to and/or from other devices via a network such as the Internet 875. The communications subsystem may additionally support short range inductive communications with passive devices (NFC, RFID etc).

Figure 9:
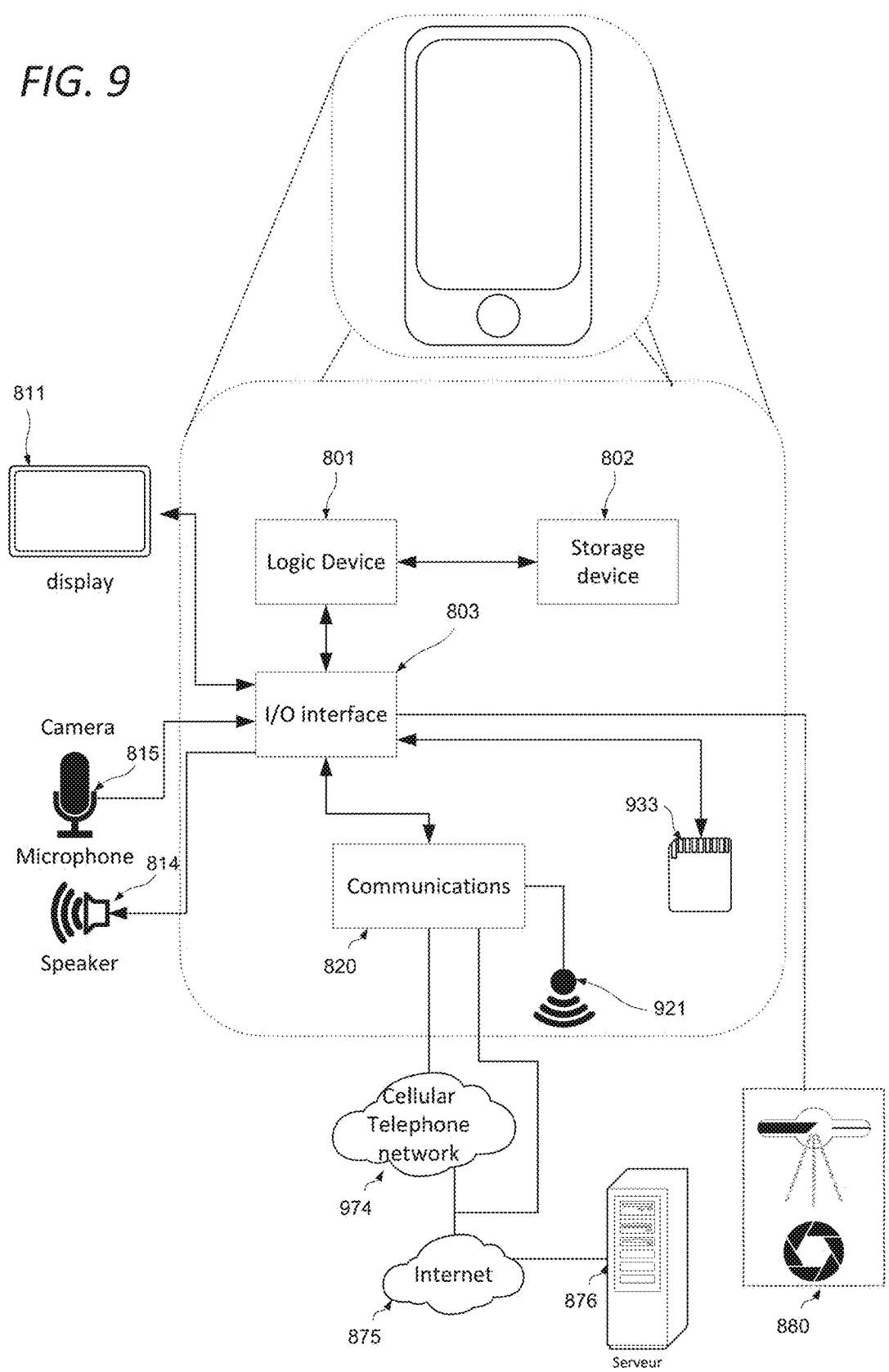
FIG. 9 shows a smartphone device adaptable to constitute an embodiment.
Figure 10:
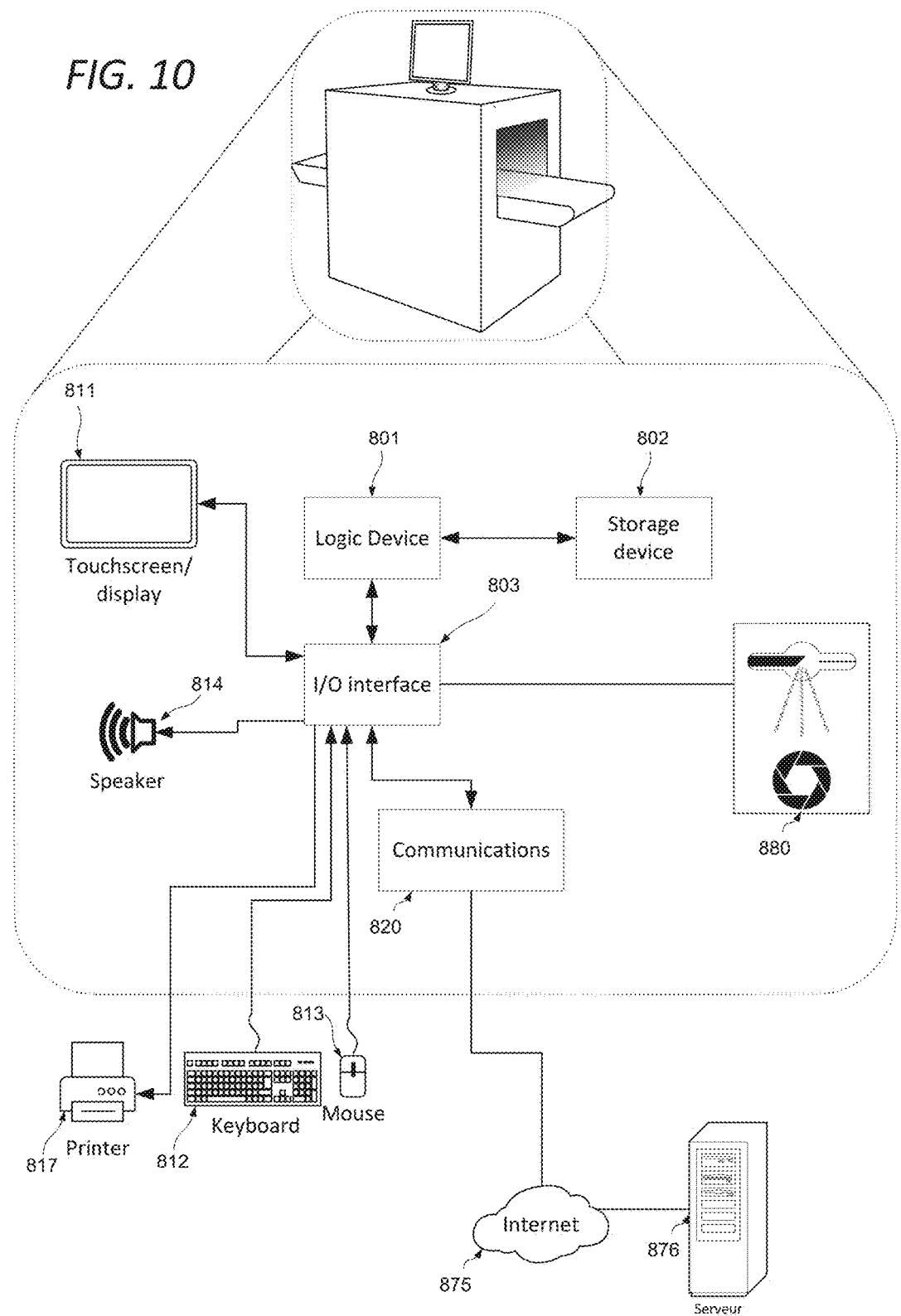
FIG. 10 shows an object scanner system adaptable to constitute an embodiment.

The system of FIG. 8 is intended to reflect a broad range of different types of information handling system. It will be appreciated that many of the subsystems and features described with respect to FIG. 8 are not required for implementation of the invention, but are included to reflect possible systems in accordance with the present invention. It will be appreciated that system architectures vary widely, and the relationship between the different sub-systems of FIG. 8 is merely schematic, and is likely to vary in terms of layout and the distribution of roles in systems. It will be appreciated that, in practice, systems are likely to incorporate different subsets of the various features and subsystems described with respect to FIG. 8. FIGS. 9, 10 and 11 disclose further example devices in accordance with the present invention. Those of ordinary skill in the art will appreciate that systems may be employed in the future which also operate in accordance with the present invention.

FIG. 9 shows a smartphone device adaptable to constitute an embodiment. As shown in FIG. 9, the smartphone device incorporates elements 801, 802, 803, 820, near field communications interface 921, flash memory 933, elements 814, 815, and 811 as described above. It is in communication with the telephone network 974 and a server 876 via the network 875. Alternative communication mechanisms such as a dedicated network or WiFi may also be used. The device may also be in communication with the scanner device 880. The features disclosed in this figure may also be included within a tablet device as well.

FIG. 10 shows an object scanner system adaptable to constitute an embodiment. This is representative of the devices used in airports and the like for scanning baggage and other articles for concealed weapons or contraband. As shown in FIG. 10, object scanner system comprises elements 801, 802, 803, 820, 814 and 817 as described above. It may be in communication with a server 876 via the network 875. Alternative communication mechanisms such as a dedicated network or WiFi may also be used. The device is also in communication with the scanner hardware 880.

FIG. 11 shows a body scanner system adaptable to constitute an embodiment. This is representative of the devices used in airports, train stations, and the like for scanning individuals for concealed weapons or contraband. As shown in FIG. 11, object scanner system comprises elements 801, 802, 803, 820, 814 and 817 as described above. It may be in communication with a server 876 via the network 875. Alternative communication mechanisms such as a dedicated network or WiFi may also be used. The device is also in communication with the scanner hardware 880.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of selecting voxels for display in a computer generated image
    based on a three dimensional volume defined by a collection of voxels, said method comprising:
        selecting a first voxel having a scalar metadata value exceeding a predetermined threshold;
        assessing each voxel adjacent said first voxel, and selecting and tagging each adjacent voxel whose scalar metadata value threshold exceeds said predetermined scalar metadata value threshold, and repeating said assessing, said selecting and said tagging for each voxel adjacent a tagged voxel by traversing a tree defined by voxels whose scalar metadata value threshold exceeds said predetermined scalar metadata value threshold, and connected to said first selected voxel by a chain of other such voxels until no further voxels meet the criteria for assessment, wherein said steps of selecting a first voxel and assessing, selecting and tagging each adjacent voxel are repeated for same set of voxels and same first selected voxel, with a plurality of different scalar metadata value threshold values, each iteration of said steps generating a respective of tagged voxels;
        generating an interpolation of two said datasets of tagged voxels to obtain an interpolated dataset of tagged voxels; and
        rendering said interpolated dataset of tagged voxels as a graphical representation for presentation to a user.

2. The method of claim 1 further comprising displaying the tagged voxels.

3. The method of claim 2 further comprising determining a virtual camera position, and establishing a straight path between a part of said object and said virtual camera position, and wherein said first voxel is selected as being the voxel nearest said virtual camera position situated along said path and exceeding said predetermined scalar metadata value threshold.

4. The method of claim 3 wherein said scalar metadata value represents the opacity of the respective voxel.

5. The method of claim 4 wherein said voxels are arranged in a non-cubic lattice.

6. The method of claim 5 wherein said tree is traversed according to a depth-first algorithm.

7. The method of claim 6 wherein said tree is traversed according to a breadth-first algorithm.

8. The method of claim 1 wherein said selecting a first voxel and said assessing each voxel are performed in real time in response to user input specifying different scalar metadata value threshold values.

9. The method of claim 1 wherein said rendering comprises rendering results of each iteration of said steps together in multiple representations of same view.

10. The method of claim 1 wherein the object defined by the voxels tagged in each said iteration is compared to a library of known objects, and the scalar metadata value threshold providing the object corresponding most closely to the library model is retained for presentation of the object to the user.

11. An apparatus adapted to select voxels for display in a computer generated image based on a three dimensional volume defined by a collection of voxels, said apparatus adapted to select a first voxel having a scalar metadata value exceeding a predetermined threshold; said apparatus being further adapted to assess each voxel adjacent said first voxel, and select and tag each adjacent voxel whose scalar metadata value threshold exceeds said predetermined scalar metadata value threshold; said apparatus being still further adapted to repeat said assessing, said selecting and said tagging for each voxel adjacent a tagged voxel by traversing a tree defined by voxels whose scalar metadata value threshold exceeds said predetermined scalar metadata value threshold, and connected to said first selected voxel by a chain of other such voxels until no further voxels meet the criteria for assessment, wherein said steps of selecting a first voxel and assessing, selecting and tagging each adjacent voxel are repeated for same set of voxels and same first selected voxel, with a plurality of different scalar metadata value threshold values, each iteration of said steps generating a respective of tagged voxels; generating an interpolation of two said datasets of tagged voxels to obtain an interpolated dataset of tagged voxels; and rendering said interpolated dataset of tagged voxels as a graphical representation for presentation to a user.

12. A computer program product stored on a non-transitory storage medium for selecting voxels for display in a computer generated image based on a three dimensional volume defined by a collection of voxels, comprising computing instructions for:
    selecting a first voxel having a scalar metadata value exceeding a predetermined threshold;
    assessing each voxel adjacent said first voxel, and selecting and tagging each adjacent voxel whose scalar metadata value threshold exceeds said predetermined scalar metadata value threshold, and repeating said assessing, said selecting and said tagging for each voxel adjacent a tagged voxel by traversing a tree defined by voxels whose scalar metadata value threshold exceeds said predetermined scalar metadata value threshold, and connected to said first selected voxel by a chain of other such voxels until no further voxels meet the criteria for assessment, wherein said steps of selecting a first voxel and assessing, selecting and tagging each adjacent voxel are repeated for same set of voxels and same first selected voxel, with a plurality of different scalar metadata value threshold values, each iteration of said steps generating a respective of tagged voxels;

generating an interpolation of two said datasets of tagged voxels to obtain an interpolated dataset of tagged voxels; and rendering said interpolated dataset of tagged voxels as a graphical representation for presentation to a user.

* * * * *